United States Patent
Kemkemian et al.

(10) Patent No.: US 11,914,019 B2
(45) Date of Patent: Feb. 27, 2024

(54) METHOD FOR DETERMINING THE DETECTION THRESHOLD OF A RADAR SUITED TO A GIVEN ENVIRONMENT

(71) Applicant: THALES, Courbevoie (FR)

(72) Inventors: Stéphane Kemkemian, Élancourt (FR); Vincent Corretja, Mérignac (FR); Sabrina Machhour, Mérignac (FR)

(73) Assignee: THALES, Courbevoie (FR)

( * ) Notice: Subject to any disclaimer, the term of this patent is extended or adjusted under 35 U.S.C. 154(b) by 552 days.

(21) Appl. No.: 17/107,604

(22) Filed: Nov. 30, 2020

(65) Prior Publication Data

US 2021/0173067 A1 Jun. 10, 2021

(30) Foreign Application Priority Data

Dec. 6, 2019 (FR) ........................................ 1913836

(51) Int. Cl.
*G01S 13/04* (2006.01)

(52) U.S. Cl.
CPC .................................... *G01S 13/04* (2013.01)

(58) Field of Classification Search
CPC ........ G01S 13/04; G01S 7/2922; G01S 13/89; G01S 7/414; G01S 7/2927; G01S 13/5244; G01S 7/2923; G01S 7/354
See application file for complete search history.

(56) References Cited

U.S. PATENT DOCUMENTS

2020/0132828 A1* 4/2020 Maniwa ................ G01S 7/414
2021/0116539 A1* 4/2021 Sick ...................... G01S 13/931

FOREIGN PATENT DOCUMENTS

JP          H0868659 A  *  3/1996  ............. G01D 3/028
WO    WO-2012101211 A1 *  8/2012  ............. G01S 7/411

OTHER PUBLICATIONS

D. Blacknell and R. J. A. Tough, "Parameter Estimation for the K-distribution based on [zlog(z)]", IEE Proceedings—Radar, Sonar and Navigation, vol. 148, No. 6, pp. 309-311, 2001.
D. Blacknell, "Comparison of parameter estimators for K-distribution", IEE Proceedings—Radar, Sonar and Navigation, vol. 141, No. 1, pp. 45-52, 1994.
G. Davidson, H.D. Griffiths, and S. Ablett, "Nonlinear and Non-Gussian Signal Processing Analysis of high-resolution land clutter" IEE Proceedings—Visual, Image Signal Processing, vol. 151, No. 1, pp. 86-91, 2004.
Foreign Communication from a Related Counterpart Application, Examination Report dated Jun. 10, 2020, French Application No. 1913836 filed on Dec. 6, 2019.

(Continued)

*Primary Examiner* — Bernarr E Gregory
*Assistant Examiner* — Juliana Cross

(57) ABSTRACT

The invention relates to a method for determining the detection threshold of a radar suited to a given environment, characterized in that it comprises at least: a step in which a set of statistical quantities characterizing said environment is selected; a step in which a set of functions is defined, each of said functions giving an intermediate detection threshold that is a function of statistical quantities taken from a subset of said set of statistical quantities; a step of combination of said intermediate detection thresholds, said detection threshold being the result of said combination.

18 Claims, 3 Drawing Sheets

(56) References Cited

OTHER PUBLICATIONS

Figure 1:
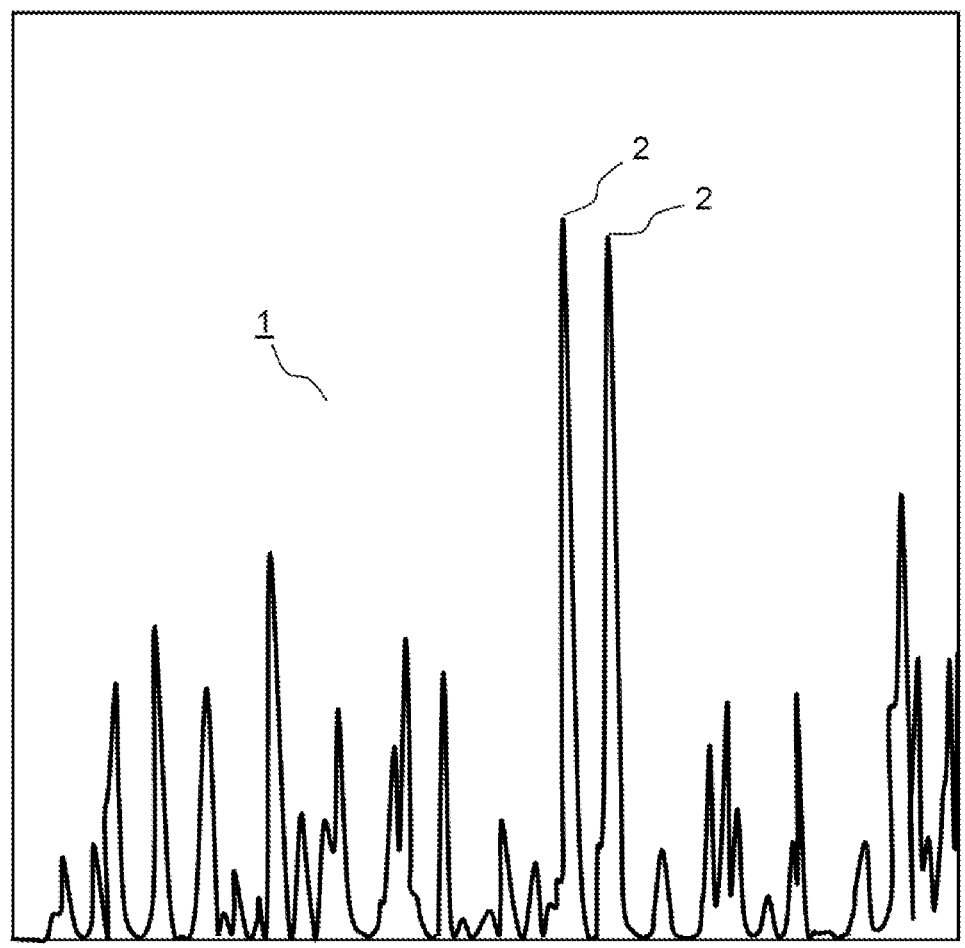

Jakubiak, "Polish Radar Technology, Part IV: Signal Detection in Non-Gaussian Clutter", IEEE Transaction on Aerospace and Electronic Systems, IEEE Service Center, vol. 27, No. 5, Sep. 1, 1991.

Chen, et al., "A new ship detection model based multi-distributions on SAR imagery", SPIE—International Society for Optical Engineering Proceedings. vol. 7109, Oct. 1, 2008.

Antipov, "Analysis of sea clutter data", XP055696543, Mar. 1, 1998; https://apps.dtic.mil/dtic/tr/fulltext/u2/a348339.pdf, retrieved on May 18, 2020.

\* cited by examiner

METHOD FOR DETERMINING THE DETECTION THRESHOLD OF A RADAR SUITED TO A GIVEN ENVIRONMENT

CROSS-REFERENCE TO RELATED APPLICATIONS

The present application claims priority to French Application No. 1913836 filed with the Intellectual Property Office of France on Dec. 6, 2019 and entitled "Method for determining the detection threshold of a radar suited to a given environment," which is incorporated herein by reference in their entirety for all purposes.

The present invention relates to a method for determining the detection threshold suited to a given environment, it applies notably for the surveillance radars that are provided with an air/sea detection mode. The invention is, for example, intended for airborne radars.

The higher (finer) the distance resolution and the more grazing the observation (case where the altitude of the carrier of the radar is low), the more the signal returned by the sea, called clutter, deviates from the gaussian statistics. Indeed, amplitude peaks, called spikes, give rise to so-called heavy-tailed distributions. In other words, the more grazing the observation, the lower the level of sea clutter perceived, but spikes are superimposed on the clutter. In this context, the K law is commonly used to model the sea clutter.

These spikes lead to an increase in false alarms. In these conditions, it is necessary to adapt the radar detection threshold to the environment in order to retain an acceptable probability of false alarms (PFA).

One technical problem to be resolved is therefore how to determine a detection threshold, suited to the environment, that is as efficient as possible, that is to say committing the fewest possible errors on the estimated threshold value. In fact:

If the threshold is over-evaluated, the PFA is satisfactory but the radar is desensitized,
If the threshold is under-evaluated, the PFA is unacceptable.

Several methods from the prior art are known for resolving this technical problem.

A first method consists in uprating in a fixed manner the detection threshold that would have been calculated in the presence of only thermal noise (purely Gaussian disturbance). This new threshold is applied to the entire radar map. This causes the fixed PFA to be maintained. However, the probability of detection is greatly degraded as predicted by the Neyman-Pearson criterion.

Another known method breaks down the radar map into blocks. For each block, the probability density of interferences (clutter and thermal noise) is estimated by regression with a parametric model and the detection threshold is calculated for a given PFA. More specifically, it is the CCDF ("Complementary Cumulative Distribution Function"), or complementary distribution function, which is estimated. This method is relatively independent of a precise clutter model. However, it requires a large number of training samples per block. Because of this, the inevitable non-uniformities within each block degrade the performance of the method, particularly when targets or objects other than sea clutter are present.

A third method could use a modelling of the sea clutter by an a priori law (generally the K law) to which is added the thermal noise of the receiver. In order to limit the rate of false alarms linked to this law, the processing proposes a local adaptation of the detection threshold as a function of the environment encountered on the basis of the corresponding sea clutter model. For this modelling, the environment disturbing the detection is characterized by a distribution with several characteristic parameters, including in particular:

the total average power of the noise and of the clutter;
the clutter-to-noise ratio, denoted CNR;
the form factor v of the K distribution.

One drawback with this approach is notably that the estimation of the statistical properties can be biased or have a wide variance, for example within certain CNR regions.

One aim of the invention is notably to mitigate the abovementioned drawbacks of the prior art by determining an acceptable PFA threshold.

To this end, the subject of the invention is a method for determining the detection threshold of a radar suited to a given environment, this method comprising at least:

a step in which a set of statistical quantities characterizing said environment is selected;
a step in which a set of functions is defined, each of said functions giving an intermediate detection threshold that is a function of statistical quantities taken from a subset of said set of statistical quantities;
a step of combination of said intermediate detection thresholds, said detection threshold being the result of said combination.

In a particular implementation, said set of statistical quantities comprising N statistical quantities, said quantities forming a space with N dimensions, said combination is such that said space is split into partitions of dimensions smaller than or equal to N, each function being associated with a partition. Said intermediate detection threshold is, for example, constant over a partition. The threshold is not necessarily constant, it is the function which gives the intermediate threshold which does not change. On the other hand, the function is not necessarily a constant function and depends on the statistical quantities forming the subset.

When two partitions overlap, the detection threshold on the zone of overlap is, for example, a function of the thresholds associated with said two partitions. The detection threshold in the zone of overlap is, for example, a weighted sum of the thresholds associated with said two partitions.

The number of statistical quantities contained within said set is strictly greater than two. The statistical quantities characterize, for example, sea clutter and thermal noise.

Said functions giving said intermediate thresholds are, for example, determined for different environment configurations.

Another subject of the invention is a radar implementing the method as previously described.

BRIEF DESCRIPTION OF THE FIGURES AND DRAWINGS

Figure 2:
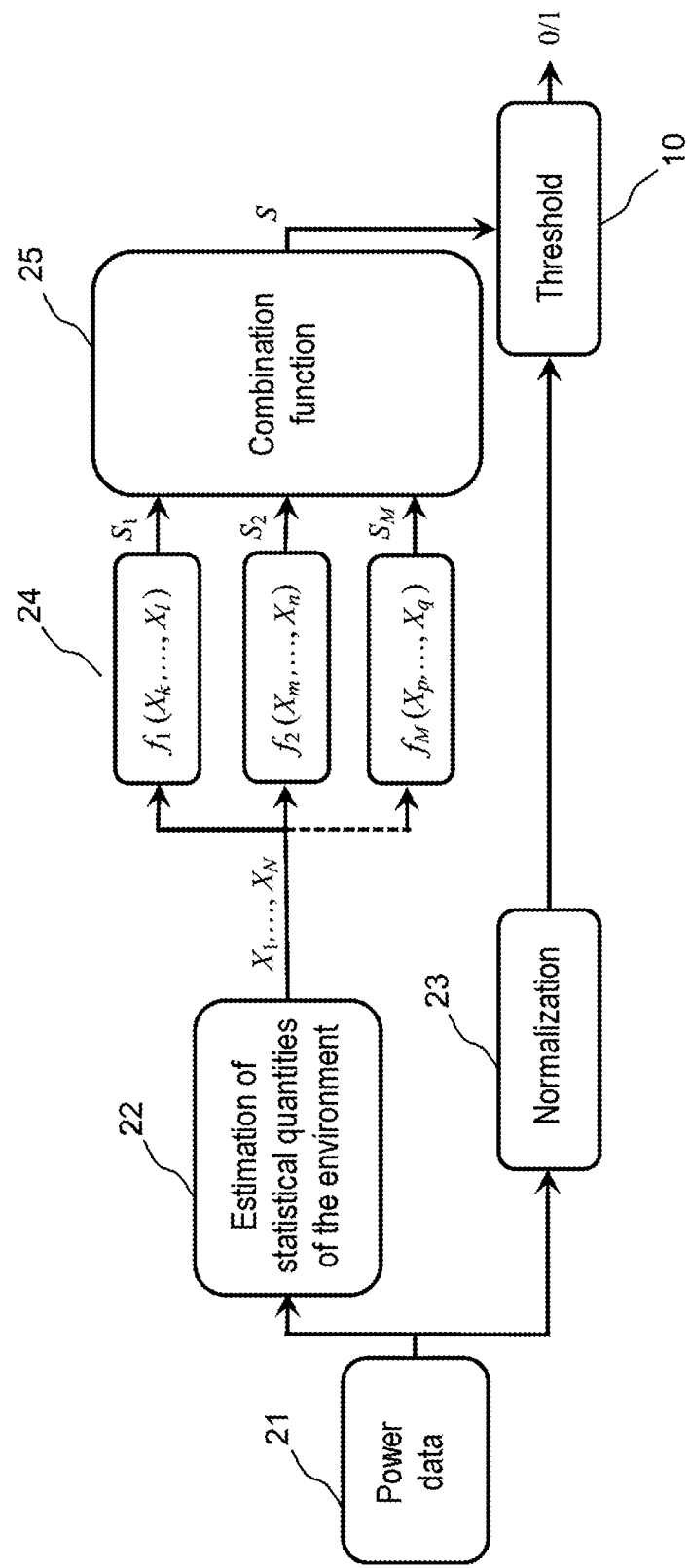
Figure 3:
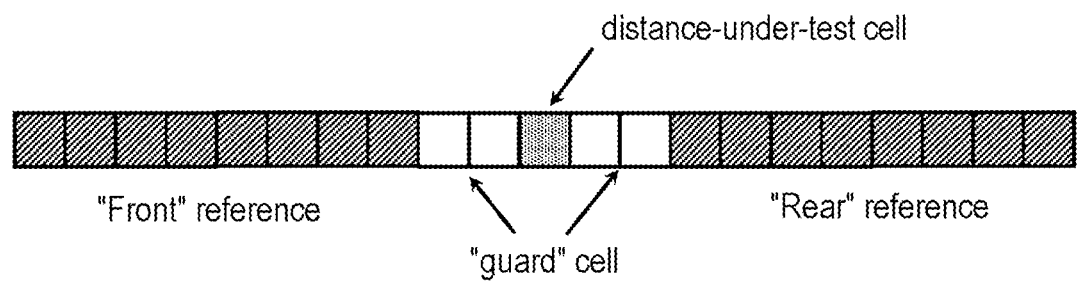
Figure 4:
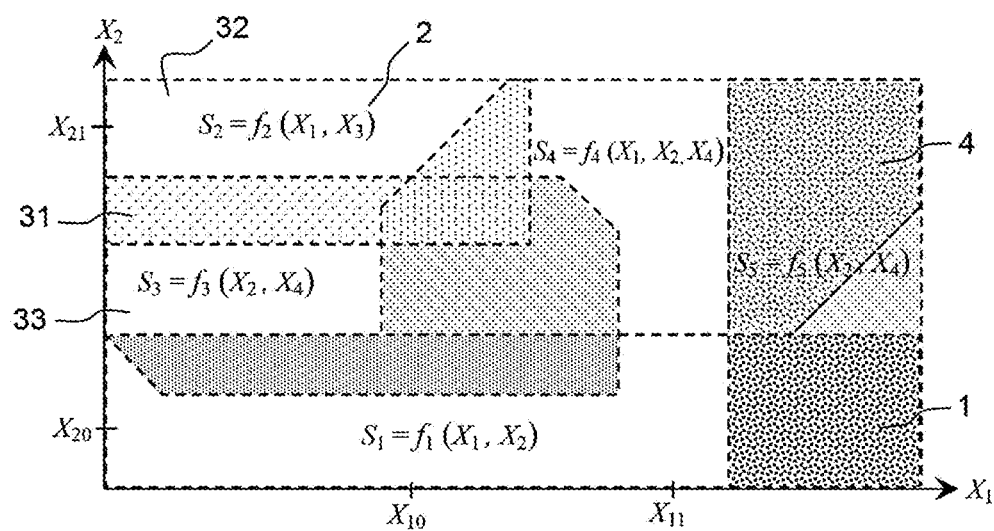

Other features and advantages will become apparent from the following description, given in light of the attached drawings which represent:

FIG. 1, an illustration of the sea clutter in grazing observation mode;
FIG. 2, a presentation of the steps implementing the method according to the invention;
FIG. 3, the principle of an example of contrast detection at distance;
FIG. 4, an illustration of the principle of deduction of the detection threshold according to the invention.

FIG. 1 illustrates the appearance of the signal 1 returned by the sea (clutter) in the case of grazing radar observation, the carrier being at low altitude. The clutter comprises amplitude peaks 2 (spikes) leading to an increase in false alarms, as explained previously.

FIG. 2 illustrates the different functions of implementation of the method according to the invention. The latter is based on the third method of the prior art presented previously. However, it differs from that in that there is no effort to explicitly estimate the parameters which usually characterize the distribution, notably the form factor v of the K distribution of the clutter. The solution provided by the invention is therefore different from the methods for characterizing the clutter distribution such as those described notably in the document by D. Blacknell and R. J. A. Tough, "Parameter Estimation for the K-distribution based on [zlog (z)]", IEE Proceedings—Radar, Sonar and Navigation, Vol. 148, No. 6, pp. 309-311, 2001 (document D1). In the present invention the objective is to directly deduce what detection threshold should be put in place as a function of measurements of various statistical quantities (parameters) obtained easily with a population of learning data. Without losing generality, the simplifying assumption is made that the environment is made up of sea clutter and of thermal noise, without the presence of disturbing phenomena of precipitation cloud type or other phenomena. The invention is based on the use of data sets, a limited number of samples being considered in order to respect the uniformity of the samples and to limit the required computation power.

The signals 21 received by the radar are sampled in a conventional way for digital processing. For the detection, the power of these received signals is considered, the power of a sample being conventionally calculated on the basis of its I and Q components. It is these power data which will be taken into account with the thresholding function 10 to confirm a detection.

Obtaining the thresholding function 10 begins with a step 22 in which a set of statistical quantities characteristic of the environment is defined. The statistical quantities that are chosen are also a function of the signals, and therefore of the power data 21 that are expected to be processed.

Thus, a set of N statistical quantities which make it possible to characterize the environment is defined. $\{X_i\}_{i=1,\ldots,N}$ denotes these N characteristic quantities. In the case of the invention, N is strictly greater than 2. Some of the parameters $X_i$ can be, notably:
the clutter-to-noise ratio, denoted CNR,
and the impulsivity of the received signals (characterizing the impulsivity of the mixture of clutter and thermal noise), denoted IMP.

These two parameters characterize the appearance of the clutter and therefore the environment. In the case of grazing observation, the appearance of the clutter is as illustrated by FIG. 1, with a low CNR and a high impulsivity characterized by the spikes 2.

The impulsivity can be expressed by a quantity defined according to the following relationship:

$$IMP \stackrel{\Delta}{=} \log \frac{1}{n}\sum_{i=1}^{n} x_i - \frac{1}{n}\sum_{i=1}^{n} \log x_i$$

in which n designates the number of learning samples and $x_i$ the $i^{th}$ sample this clutter 2. In other words, IMP is the difference of the logarithm of the arithmetic mean of the learning samples minus the logarithm of the geometric mean of the same learning samples.

It is known that this estimator IMP or even that of the document D1 "[zlog(z)]", provides an estimation of the optimal detection threshold, close to the criterion of maximum likelihood in the absence of thermal noise or if the clutter-to-noise ratio is very much greater than 1 (or if CNR>>1). However, it is also known that, with low CNR, the estimation is very inaccurate. In these conditions, the detection threshold to be set is therefore=$f_{IMP}$ (IMP, CNR), a threshold that can be established by calculation or by simulation (offline).

With low CNR ratio, it is also possible to use the statistical moments M1, M2, M3 or even M4 (first, second, third or even fourth order moments) as statistical quantities. The document D1 notably proposes five methods for estimating statistical quantities based on the moments and log-moments in order to quantify the "impulsive" nature of the sea clutter. It is also possible to use other statistical quantities deduced from these moments (Kurtosis, Skewness, etc.). However, a problem specific to these estimators is their great sensitivity to the possible presence of targets in the population of samples, giving rise to a high overestimation of the threshold. These known solutions are therefore not satisfactory.

According to the so-called "ordered statistics" approach, it is also possible to define, as statistical parameter (estimator), the number of samples $Q_\lambda$ crossing one or more power levels T=µλ, in which µ designates the local mean of the samples, several mean operators being able to be used (arithmetic or geometrical in particular). This estimator, much less sensitive to the presence of targets, therefore consists in counting, over a range of resolution of the radar, the number of overshoots with respect to a test level T=µλ. This test is facilitated by a step 23, the power of the samples received 21 is standardized with respect to a local average, for example by using the known CA-CFAR ("Cell Average—Constant False Alarm Rate") method. A set of standardized samples is thus obtained with a target average value of 1.

This test of level relative to a local mean can be performed after a contrast detector of CA-CFAR type but also after any other known contrast detector. The test therefore amounts to counting the number of contrasts greater than T/µ=λ. Thus, a target whose level exceeds T counts as an overshoot regardless of the power of the target, hence the lesser sensitivity of this estimator mentioned above.

FIG. 3 illustrates the principle of contrast detection at distance, of CA-CFAR type. In this example, the local average p is calculated using reference averages before the distance-under-test cell and after the cell under test. The test consists in comparing the power PCUT of the cell under test relative to T=µλ. If PCUT>T, 1 is counted, otherwise 0 is counted. The operation is repeated in a sliding manner over all the resolution cells (distance cells) of the range being processed. The term λ is ideally chosen so that the number of overshoots "at rest" over thermal noise is greater than the maximum number of targets likely to be found within an interval of p resolution cells of the radar, in practice of the order of ten or so. In the general case, $Q_\lambda$ overshoots of the test value Tare obtained.

According to the latter approach, it is possible to deduce the detection threshold to be set $S=f_\lambda(Q_\lambda, CNR)$. An improvement consists in adding IMP as third argument and therefore $S=f_{\lambda,IMP}(Q_\lambda, CNR, IMP)$. The functions $f_\lambda$ or $f_{\lambda,IMP}$ can be obtained by calculation or by simulation (offline).

The statistical parameters presented above are not limiting. Other statistical parameters can be used to characterize the environment in this step 22.

In another step 24, a set of functions $\{f_j\}_{j=1,\ldots,M}$ is defined such that each function $f_j(\{Y\}_j)$ provides a more or less accurate estimation of the detection threshold, $\{Y\}_j$ being a set of statistical quantities. These functions $f_j$ are, for example, obtained by simulation. There is not necessarily any analytical expression of these functions, so they can therefore be defined by tabulation. There is the following inclusion: $\{Y\}_j \subset \{X\}$, that is to say that each estimation function uses only a subset $\{Y\}_j$ of the total set of the statistical quantities $\{X\}$. In the representation of FIG. 2, the function $f_1$ is applied to a subset $\{X_k, \ldots, X_l\}$, the function $f_2$ is applied to a subset $\{X_m, \ldots, X_n\}$ and the $M^{th}$ function $f_M$ is applied to a subset $\{X_p, \ldots, X_q\}$.

The set of functions $f_j$ is chosen such that, in the set of the functions $f_j(\{Y\}_j)$, there is always at least one function which makes it possible to estimate the threshold s "optimally" (in the sense of the preceding criterion) at each point of the useful range of the environment parameters (statistical quantities). There is therefore at least one threshold $s=f_j(\{Y\}_j)$.

These different functions of the set $\{f_j\}_{j=1,\ldots,M}$ making it possible to directly estimate the detection threshold as a function of certain quantities $X_i$, can be determined either by Monte-Carlo methods, or by a deterministic method.

In another step 25, a function of combination of the functions $f_j$ is defined to define the final threshold.

The final threshold S is therefore obtained by a function of combination C of the intermediate thresholds:

$$S=C(s_1,\ldots,s_M|X_1,\ldots,X_N)$$

This combination function will be detailed below.

The steps 22, 24 and 25 are established beforehand in order to be subsequently used for the processing of the power of the received signal samples 21. In other words, the thresholding function defined from the definition of the environment parameters (step 22), from the functions $f_j$ (step 24) and from the combination function (step 25) is calculated for all the input data 21 used during the radar mission, at least for a mission period that can be characterized by the environment parameters retained. The thresholding function S is thus pre-calculated and it is applied in the thresholding step 10 to the power data 21 of the samples received, after these data have been standardized 23 as described previously.

For the combination function, the principle of the invention is to use several intermediate detection thresholds $s_i$ each determined as a function of various statistical parameters $X_i$ (by the functions $f_j$) in order to combine them to have a detection threshold S that is the most robust to the different environment configurations which can be encountered.

One possible solution is to partition the space of the statistical parameters $X_i$ so as to assign a threshold calculation mode to each partition. In a very simple case of the two threshold estimators $S_{IMP}=f_{IMP}(IMP, CNR)$ and $s_\lambda=f_\lambda(Q_\lambda, CNR)$ described previously, an example of combination function C can be defined as follows.

$$S=C(S_{IMP},s_\lambda|CNR)$$

With:

$$\begin{cases} C = f_{IMP} \text{ if } CNR > CNR_{high} \\ C = f_\lambda \text{ if } CNR < CNR_{low} \\ C = \alpha(CNR)f_{IMP} + (1-\alpha(CNR))\,f_\lambda \text{ otherwise} \end{cases}$$

in which $CNR_{high}$ denotes the "boundary" of CNR above which the threshold $S_{IMP}$ is optimal and $CNR_{low}$ denotes the "boundary" of CNR above which the threshold sa is optimal with a zone of transition (overlap) between the two "boundaries".

The function $\alpha(CNR)$ lies between 0 and 1 and makes it possible to switch progressively from one estimator to the other in the zone of overlap. It is for example possible to use a modified sigmoid function such that its value is 0 in $CNR_{low}$ and 1 in $CNR_{high}$. Typical limit CNR values are, for example: $CNR_{low}=-3$ dB and $CNR_{high}=+6$ dB.

FIG. 4 illustrates the partitioning of the space of the parameters in a wider case, with four functions and four parameters. Based on this positioning, the detection threshold is deduced therefrom. As an example, the four environment parameters retained are:

The clutter-to-noise ratio, CNR;

The impulsivity, IMP;

The number of overshoots of level $Q_\lambda$, for example for $\lambda=+6$ dB;

The ratio of the second order statistical moment to that of the first order.

To select a function, a space is taken with N dimensions, N being the number of environment parameters used. In the example of FIG. 4, N is equal to 4. The space with N dimensions is partitioned into subspaces. Depending on the values of the parameters $X_1, X_2, X_3, X_4$, the location is a given partition corresponding to a function $f_i$.

For simplicity of representation, the partitioning is represented only in two dimensions, based on two characteristic quantities $X_1$ and $X_2$ (for example $X_1$=CNR and $X_2$=IMP), whereas four characteristic quantities are used: $X_1$, $X_2$, $X_3$, $X_4$. The partitioning space therefore has four dimensions. The partitions can be contiguous or exhibit a certain overlap. The number of partitions is equal to the cardinal M of $\{f_j\}_{j=1,\ldots,M}$, corresponding in fact to the number of functions $f_i$ established.

Thus, by way of example, for $X_1=X_{10}$ and $X_2=X_{20}$, the threshold S is defined by the threshold $s_1=f_1(X_1,X_2)$ and for $X_1=X_{11}$ and $X_2=X_{21}$, the threshold S is defined by the threshold $s_4=f_4(X_1,X_2,X_4)$.

Each partition is associated with a function $f_j$, but it is possible for partitions to overlap. Within these overlaps, it is possible to provide a weighting between the functions specific to each overlapping partition. Thus, in the zone of overlap 31 between the partition 32 associated with $f_2$ and the partition 33 associated with $f_3$, it is possible to provide a threshold $s_{23}=\alpha\,s_2+\beta\,s_3$, $\alpha$ and $\beta$ being less than 1 and a function, for example, of the respective areas of the partitions 32, 33. This principle can be extended to an overlapping of more than two partitions.

The partition of FIG. 4 is pre-established, it is matched to a given PFA. The space of the environment parameters with N dimensions (N=4 in the example of FIG. 4) thus partitioned is memorized in the processing means of the radar with the associated functions $f_i$. These thresholding elements are for example stored in tabulation form.

The final threshold defined by the combination function, for example according to the partition in the space of the environment parameters, is the detection threshold sought. The power of the signals received is compared with this threshold. With respect to FIG. 2, the powers of the samples received are, for example, standardized 23 before comparison 10 with the threshold.

The invention claimed is:

1. A method for determining a detection threshold of a radar suited to a given environment, wherein the method comprises:
- selecting a set of statistical quantities characterizing said environment;
- defining a set of functions, each of said functions giving an intermediate detection threshold that is a function of statistical quantities taken from a subset of said set of statistical quantities;
- combining said intermediate detection thresholds to determine the detection threshold suited to said environment, said detection threshold being the result of said combination; and
- using said detection threshold by the radar for comparison against received signals;
- wherein the number of statistical quantities contained in said set of statistical quantities is strictly greater than two.

2. The method according to claim 1, wherein said set of statistical quantities comprises N statistical quantities, said quantities forming a space with N dimensions, and wherein the step of combining said intermediate detection thresholds is such that said space is split into partitions of dimensions smaller than or equal to N, each function being associated with a partition.

3. The method according to claim 2, wherein said intermediate detection threshold is constant over a partition.

4. The method according to claim 2, wherein when two partitions overlap, the detection threshold on the zone of overlap is a function of the thresholds associated with said two partitions.

5. The method according to claim 4, wherein the detection threshold in the zone of overlap is a weighted sum of the thresholds associated with said two partitions.

6. The method according to claim 1, wherein said set of statistical quantities comprises at least two quantities from among the following quantities:
- the impulsivity of the received signals;
- the signal-to-noise ratio;
- the number of overshoots of a preestablished power level.

7. The method according to claim 1, wherein said statistical quantities characterize sea clutter and thermal noise.

8. The method according claim 1, wherein said functions giving said intermediate thresholds are determined for different environment configurations.

9. The method according to claim 1, wherein said radar is airborne.

10. A radar, wherein the radar is configured to:
- select a set of statistical quantities characterizing said environment;
- define a set of functions, each of said functions giving an intermediate detection threshold that is a function of statistical quantities taken from a subset of said set of statistical quantities;
- combine said intermediate detection thresholds to determine a detection threshold suited to said environment, said detection threshold being the result of said combination; and
- use said detection threshold for comparison against received signals;
- wherein the number of statistical quantities contained in said set of statistical quantities is strictly greater than two.

11. The radar of claim 10, wherein said set of statistical quantities comprises N statistical quantities, said quantities forming a space with N dimensions, and wherein the step of combining said intermediate detection thresholds is such that said space is split into partitions of dimensions smaller than or equal to N, each function being associated with a partition.

12. The radar of claim 11, wherein the intermediate detection threshold is constant over a partition.

13. The radar of claim 11, wherein when two partitions overlap, the detection threshold on the zone of overlap is a function of the thresholds associated with said two partitions.

14. The radar of claim 13, wherein the detection threshold in the zone of overlap is a weighted sum of the thresholds associated with said two partitions.

15. The radar of claim 10, wherein the set of statistical quantities comprises at least two quantities from among the following quantities:
- the impulsivity of the received signals;
- the signal-to-noise ratio;
- the number of overshoots of a preestablished power level.

16. The radar of claim 10, wherein the statistical quantities characterize sea clutter and thermal noise.

17. The radar of claim 10, wherein the functions giving said intermediate thresholds are determined for different environment configurations.

18. The radar of claim 10, wherein the radar is airborne.

* * * * *